United States Patent
Kang et al.

(10) Patent No.: US 12,179,967 B2
(45) Date of Patent: Dec. 31, 2024

(54) WELDING WIRE ACCOMMODATION-CONTAINER COVER

(71) Applicant: KISWEL LTD., Busan (KR)

(72) Inventors: Ho Kyu Kang, Changwon-si (KR);
Seong Hun Kim, Changwon-si (KR);
Chang Uk Song, Changwon-si (KR);
Kyo Hun Kim, Changwon-si (KR)

(73) Assignee: KISWEL LTD., Busan (KR)

( * ) Notice: Subject to any disclaimer, the term of this patent is extended or adjusted under 35 U.S.C. 154(b) by 0 days.

(21) Appl. No.: 18/012,709

(22) PCT Filed: May 21, 2021

(86) PCT No.: PCT/KR2021/006375
§ 371 (c)(1),
(2) Date: Dec. 23, 2022

(87) PCT Pub. No.: WO2021/261776
PCT Pub. Date: Dec. 30, 2021

(65) Prior Publication Data
US 2023/0331445 A1 Oct. 19, 2023

(30) Foreign Application Priority Data
Jun. 26, 2020 (KR) .................. 10-2020-0078302

(51) Int. Cl.
*B65D 47/36* (2006.01)
*B23K 9/133* (2006.01)
(Continued)

(52) U.S. Cl.
CPC ............. *B65D 47/36* (2013.01); *B65D 43/22* (2013.01); *B65D 51/24* (2013.01); *B65D 85/04* (2013.01);
(Continued)

(58) Field of Classification Search
CPC .................... B65D 47/36; B65D 85/04; B65D 2543/00212; B65D 43/22; B65D 51/20; B23K 9/133
(Continued)

(56) References Cited

U.S. PATENT DOCUMENTS 6,715,608 B1 * 4/2004 Moore .................. B65H 49/08
206/397
7,367,452 B1 * 5/2008 Hsu ...................... B23K 9/1333
206/397
(Continued)

FOREIGN PATENT DOCUMENTS

KR 10-0463362 B1 1/2005
KR 10-1948698 B1 2/2019
(Continued)

OTHER PUBLICATIONS

International Search Report of PCT/KR2021/006375 dated Sep. 28, 2021 [PCT/ISA/210].
(Continued)

*Primary Examiner* — Rafael A Ortiz
(74) *Attorney, Agent, or Firm* — Sughrue Mion, PLLC

(57) ABSTRACT

One embodiment of the present invention provides a welding wire accommodation-container cover comprising: a blocking part which has a shape corresponding to a transverse cross section of a container body part, and which covers the opening of the container body part; side-forming parts which are connected to the blocking part, and which are bent from the blocking part so as to be fitted to encompass the outer side surface of the upper portion of the container body part; side-fixing parts which are alternately provided with the side-forming parts along the side of the blocking part, and which fix neighboring side-forming parts; and a cut part which is formed at the blocking part, and (Continued)

which can be cut so that a welding wire wound around the container body part can be withdrawn to the outside.

6 Claims, 7 Drawing Sheets

(51) Int. Cl.
  *B65D 43/22* (2006.01)
  *B65D 51/24* (2006.01)
  *B65D 85/04* (2006.01)
(52) U.S. Cl.
  CPC .... *B23K 9/133* (2013.01); *B65D 2543/00212* (2013.01)
(58) Field of Classification Search
  USPC ........ 206/413, 407, 403, 398, 397, 395, 389
  See application file for complete search history.

(56) References Cited

U.S. PATENT DOCUMENTS

| | | |
|---|---|---|
| 2001/0013479 A1 | 8/2001 | Giancarlo |
| 2003/0192802 A1 | 10/2003 | Dragoo et al. |
| 2004/0007487 A1* | 1/2004 | Cantu-Gonzalez .... B65D 85/04 206/397 |
| 2005/0127233 A1* | 6/2005 | Hsu ...................... B23K 9/1333 242/593 |
| 2007/0175786 A1* | 8/2007 | Nicklas ................. B65D 85/04 206/395 |
| 2011/0203948 A1 | 8/2011 | Barhorst et al. |
| 2013/0081967 A1 | 4/2013 | Gaul et al. |
| 2015/0353270 A1* | 12/2015 | Gaul ..................... B65D 85/672 206/409 |
| 2018/0354710 A1* | 12/2018 | Foster, II ............... B23K 9/133 |
| 2019/0047742 A1* | 2/2019 | Wallace ................. B65D 5/005 |
| 2019/0263555 A1* | 8/2019 | Kim ........................ B65D 5/64 |

FOREIGN PATENT DOCUMENTS

| | | | |
|---|---|---|---|
| WO | WO-2015164932 A1 * | 11/2015 | ............. B65D 15/08 |
| WO | 2018/226480 A1 | 12/2018 | |

OTHER PUBLICATIONS

Extended European Search Report dated Aug. 21, 2024 in Application No. 21829224.1.

* cited by examiner (a)

(b)

WELDING WIRE ACCOMMODATION-CONTAINER COVER

CROSS REFERENCE TO RELATED APPLICATIONS

This application is a National Stage of International Application No. PCT/KR2021/006375, filed May 21, 2021, claiming priority to Korean Patent Application No. 10-2020-0078302, filed Jun. 26, 2020, the entire disclosures of which are incorporated herein by reference.

TECHNICAL FIELD

The present invention relates to a welding wire accommodation-container cover. More specifically, the present invention relates to a welding wire accommodation-container cover provided with a cut part which may be easily torn off and used right away when using a welding wire wound around the container, thereby allowing easy use for not requiring a separate head cap member.

BACKGROUND

A welding wire is a metal wire used for welding, and this welding wire is used for automatic and semi-automatic welding.

A method of storing such welding wire includes a method of storing the welding wire by winding it on a reel-shaped spool, and a method of storing the welding wire by winding it in a coil shape in a large-capacity welding wire accommodation-container.

At this time, when storing the welding wire in a welding wire accommodation-container, a greater amount of welding wire may be stored than when storing the welding wire on a spool. Therefore, shipyards or other companies with welding automation facilities use welding wire stored in a welding wire accommodation-container.

Such welding wire accommodation-container includes a container body part, a cover and a sealing part. Here, a hollow is formed in the container body part, so that the welding wire may be accommodated in the container body part in a coil shape.

The cover is coupled to an upper portion of the container body part, and prevents the welding wire accommodated in the container body part from escaping. Also, in a state in which the container body part is coupled to the cover, the sealing part encompasses and seals the coupling portion between the container body part and the cover.

At this time, according to prior art, the cover is removed when using the welding wire, and a separate head cap member is used being coupled to the container body part. Also, the welding wire wound around the container body part is used being connected to an external wire withdrawing device through a hole formed in the head cap member.

When the welding wire wound around the welding wire accommodation-container is used up, in general, the accommodation-container including the cover is discarded after being used for a predetermined number of times. At this time, there is an inconvenience in that not only the accommodation-container, but also a separate head cap member and various accompanying accessories need to be processed together. Also, there is a problem that additional costs would incur in manufacturing a separate head cap member, in addition to the accommodation-container.

Further, the welding wire accommodation-container may be classified into a single type which is used, when all the welding wire wound around one container is used up, by connecting a welding wire wound around the next container to a withdrawing device, and an endless type which is endlessly used, when the welding wire wound around one accommodation-container is almost used up, by connecting an end of the wire to a first end of the wire wound around another adjacent accommodation-container by tandeming the two accommodation-containers.

At this time, according to prior art, there is a problem that the manufacturing cost increases because a separate cover needs to be manufactured and supplied according to the type of welding wire accommodation-container as requested by the consumer.

PRIOR ART LITERATURE

US Patent Publication No. 2001-0013479 (Aug. 16, 2001)

DETAILED DESCRIPTION OF INVENTION

Technical Task

The present invention aims at solving the problems of prior art described above. It is an object of the present invention to provide a welding wire accommodation-container cover provided with a cut part which may be easily torn off and used right away when using a welding wire wound around the container, thereby allowing easy use for not requiring a separate head cap member.

Means for Solving Technical Task

In order to achieve the above object, an aspect of the present invention provides a welding wire accommodation-container cover, comprising: a blocking part which has a shape corresponding to a transverse cross section of a container body part, and which covers the opening of the container body part; side-forming parts which are connected to the blocking part, and which are bent from the blocking part so as to be fitted to encompass the outer side surface of the upper portion of the container body part; side-fixing parts which are alternately provided with the side-forming parts along the side of the blocking part, and which fix neighboring side-forming parts; and a cut part which is formed at the blocking part, and which is configured to be cut so that a welding wire wound around the container body part is withdrawn to the outside.

In an embodiment of the present invention, the cut part may comprise a first cut part which is formed in a circle in the center of the blocking part.

In an embodiment of the present invention, the cut part may comprise a second cut part which has a first straight line part and a second straight line part formed parallel from one side of the blocking part to a center portion, a curved part formed to connect the first straight line part and the second straight line part in the center portion of the blocking part, and a third straight line part formed to connect the first straight line part and the second straight line part while overlapping one side of the blocking part.

In an embodiment of the present invention, the second cut part may be configured such that the first cut part formed in the center part of the blocking part is located inside an area surrounded by the second cut part.

In an embodiment of the present invention, the first cut part may comprise a first arc part and a second arc part each configured to have different ratios of cut part per unit length, and the ratio R1 of cut part per unit length of the first arc part may be configured to be greater than the ratio R2 of cut part per unit length of the second arc part.

In an embodiment of the present invention, the ratio R3 of the cut part per unit length of at least one of the curved part and the third straight line part may be configured to be greater than the ratio R4 of cut part per unit length of the second straight line part.

In an embodiment of the present invention, the welding wire accommodation-container cover may further comprise a connection adaptor which is detachably coupled through a coupling hole formed while removing the first cut part and guides the withdrawal of welding wire wound around the container body part.

In an embodiment of the present invention, the connection adaptor may comprise: a connecting part which has a supporting part, a first bolt part formed on an upper side of the supporting part, and a second bolt part formed on a lower side of the supporting part, and a through hole formed in a central axis direction; a first washer which is fitted into the second bolt part and protects an upper surface of the blocking part when coupled; a second washer which is fitted into the second bolt part and protects a lower surface of the blocking part when coupled; and a nut which is coupled to the second bolt part and firmly tightens the first washer and the second washer.

Effect of Invention

According to an aspect of the present invention, the welding wire accommodation-container cover may be used right away without a separate head cap member by comprising a cut part, and may be implemented as an adaptor connection type or an endless type depending on its use.

The cut part may be removed more efficiently because the ratio of cut part per unit length is configured differently for each part.

The welding wire accommodation-container cover may be manufactured through an assembly of the side-forming parts and the side-fixing parts. Such welding wire accommodation-container cover may be manufactured without a separate binding member and has a simple manufacturing process.

The prefabricated cover part is made of corrugated cardboard, and thus no industrial waste is generated when discarding the prefabricated cover part.

The effects of the present invention are not limited to the above-mentioned effects, and it should be understood that the effects of the present invention include all effects that could be inferred from the configuration of the invention described in the detailed description of the invention or the appended claims.

BEST MODE FOR CARRYING OUT THE INVENTION

Figure 1:
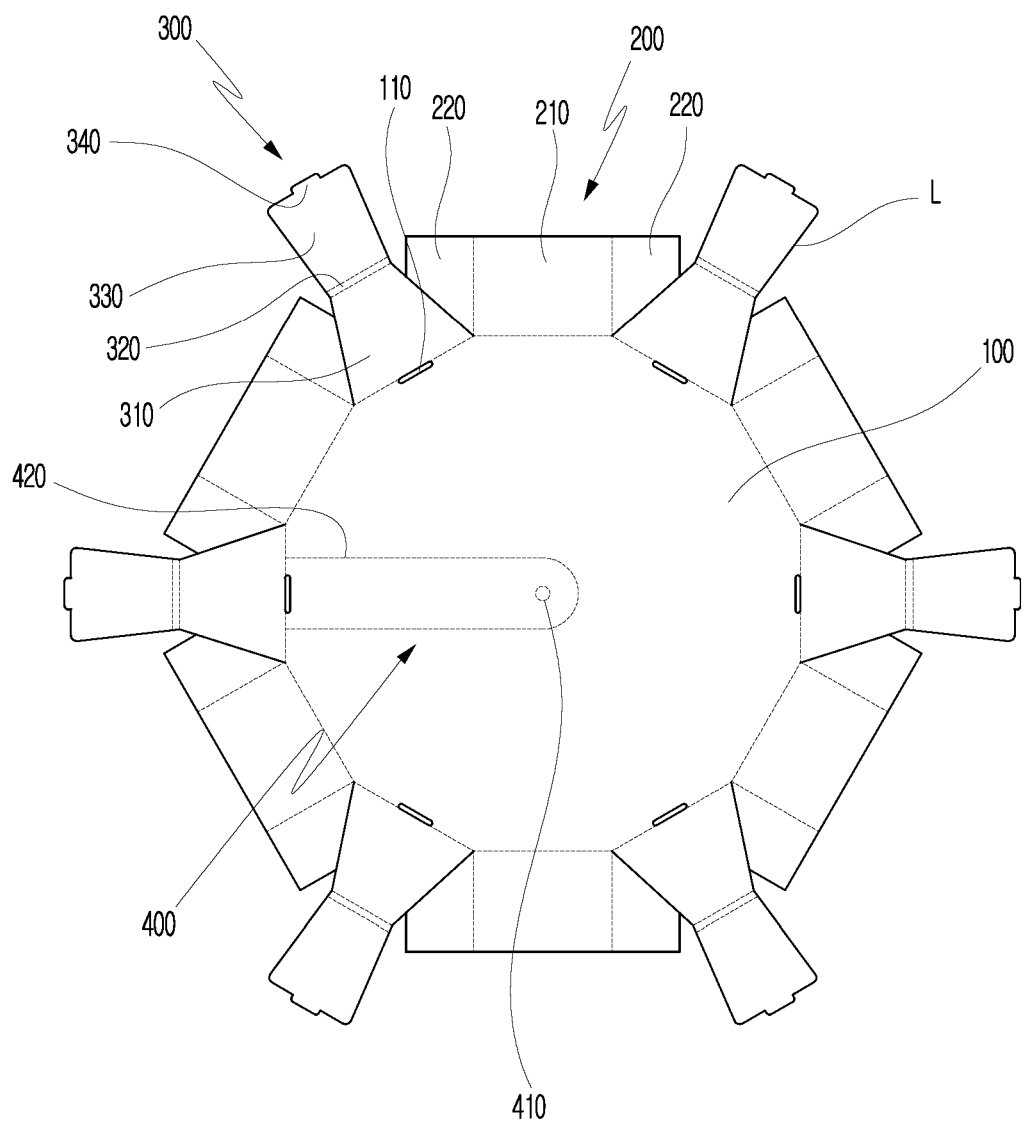
FIG. 1 is a surface development of a welding wire accommodation-container cover according to an embodiment of the present invention.

Hereinafter, the present invention will be explained with reference to the accompanying drawings. The present invention, however, may be modified in various different ways, and should not be construed as limited to the embodiments set forth herein. Also, in order to clearly explain the present invention in the drawings, portions that are not related to the present invention are omitted, and like reference numerals are used to refer to like elements throughout the specification.

Throughout the specification, it will be understood that when a portion is referred to as being "connected" to another portion, it can be "directly connected to" the other portion, or "indirectly connected to" the other portion having intervening portions present. Also, when a component "includes" an element, unless there is another opposite description thereto, it should be understood that the component does not exclude another element but may further include another element.

Hereinafter, the embodiments of the present invention will be described in detail with reference to the accompanying drawings.

Figure 2:
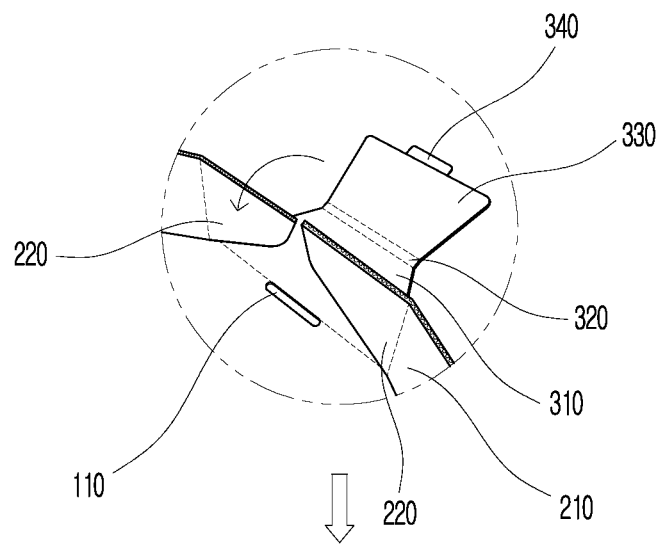
FIG. 2 is an assembly view of the main part illustrating the process of assembling a welding wire accommodation-container cover according to an embodiment of the present invention.
Figure 2:
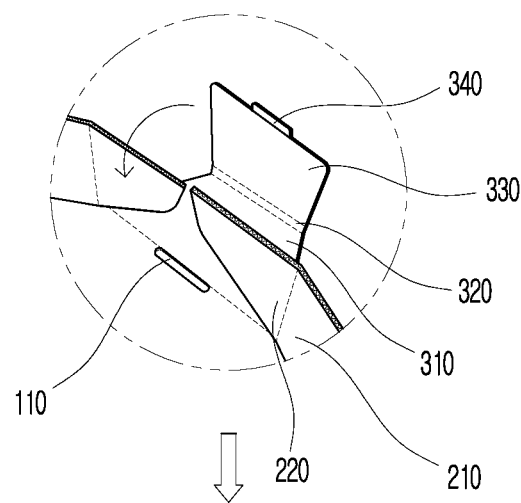
Figure 2:
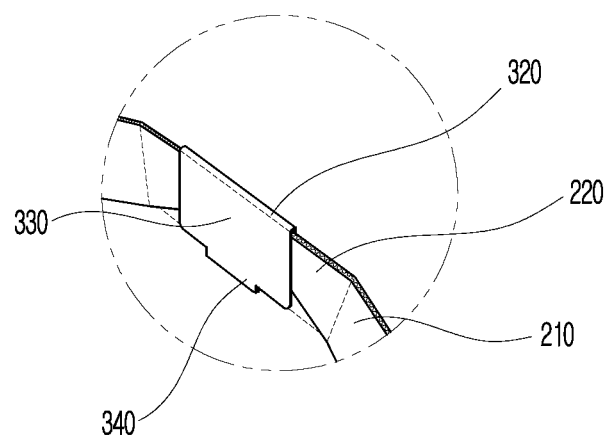
Figure 3:
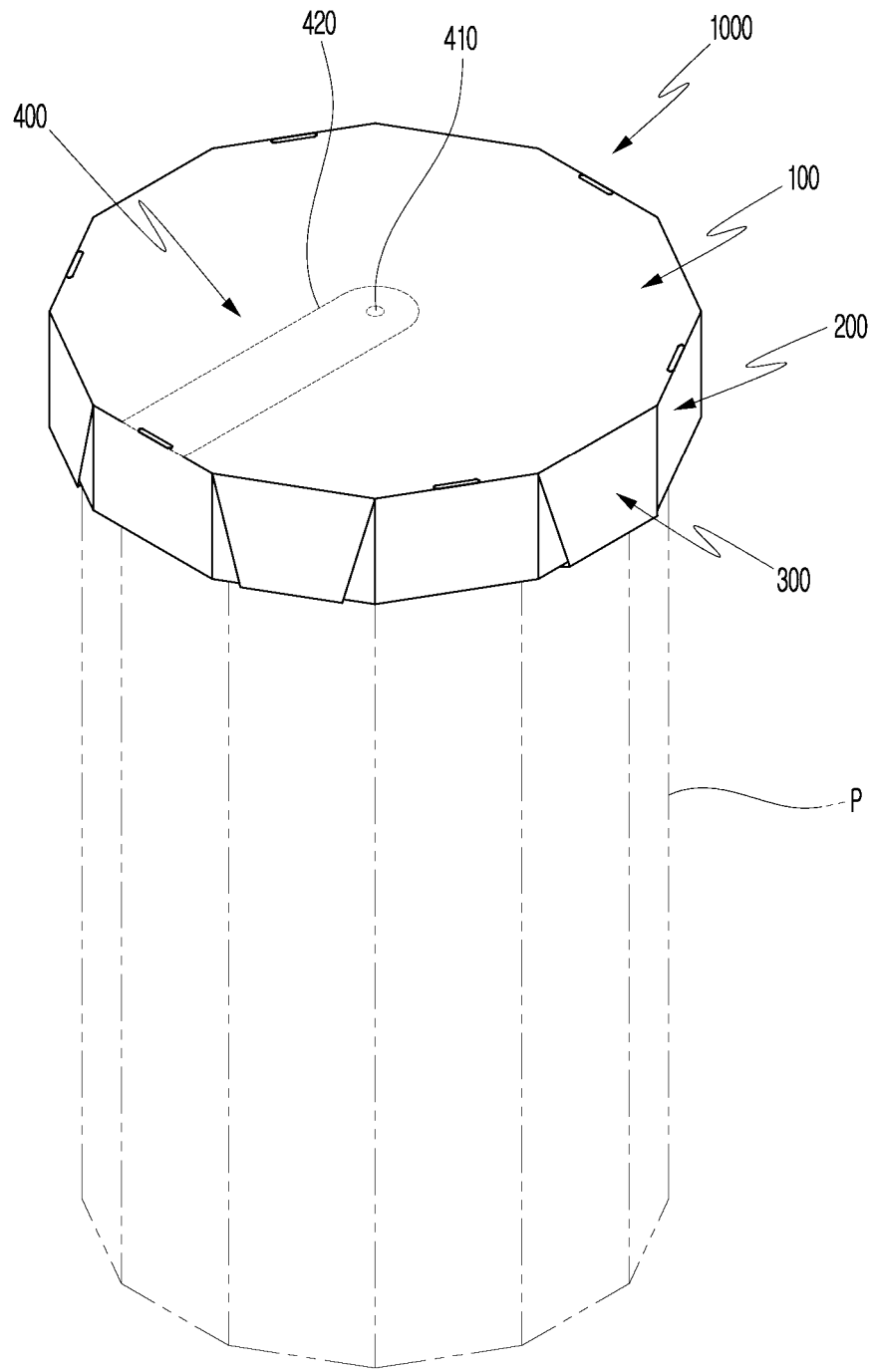
FIG. 3 is a perspective view of a welding wire accommodation-container cover assembled according to an embodiment of the present invention.

FIG. 1 is a surface development of a welding wire accommodation-container cover according to an embodiment of the present invention. FIG. 2 is an assembly view of the main part illustrating the process of assembling a welding wire accommodation-container cover according to an embodiment of the present invention. FIG. 3 is a perspective view of a welding wire accommodation-container cover assembled according to an embodiment of the present invention.

Referring to FIGS. 1 to 3, the welding wire accommodation-container cover 1000 of the present invention forms the cover 1000 of a welding wire accommodation-container through assembly. The welding wire accommodation-container cover 1000 is detachable from the upper portion of the container body part P, and is made to selectively close the opening formed on the upper portion of the container body part P.

The welding wire accommodation-container cover 1000 may be made of corrugated cardboard. Therefore, when discarding the welding wire accommodation-container, the prefabricated cover 1000 may be recycled as waste paper.

The welding wire accommodation-container cover 1000 of the present invention comprises a blocking part 100, side-forming parts 200 and side-fixing parts 300.

The blocking part 100 has a shape corresponding to a transverse cross section of the container body part P.

The blocking part 100 covers the opening when the welding wire accommodation-container cover 1000 is coupled to the container body part P.

The side-forming parts 200 are bent from the blocking part 100, and form the side surface of the welding wire accommodation-container cover 1000. Such side-forming parts 200 are fitted to encompass the outer side surface of the upper portion of the container body part P when being coupled to the container body part P.

The side-forming parts 200 are alternately provided with the side-fixing parts 300 along the side of the blocking part 100. In other words, the side-forming parts 200 and the side-fixing parts 300 are alternately provided along the side of the blocking part 100.

The side-forming parts 200 include a side surface extension member 210 and a wing member 220.

The side surface extension member 210 has a width corresponding to the side of the blocking part 100, and extends from the blocking part 100. At this time, the length of the side surface extension member 210 extending from the blocking part 100 becomes the height of the welding wire accommodation-container cover 1000.

The wing members 220 are in pairs, and are respectively connected to both sides of the side surface extension member 210. The rim of the wing member 220 is formed to have a first fixing extension member 310, a connecting member 320 and a second fixing extension member 330 in contact with each other in a state in which the side-forming parts 200 and the side-fixing parts 300 are unfolded. The wing member 220 may be manufactured by cutting the boundary line L in a state connected to the first fixing extension member 310, the connecting member 320 and the second fixing extension member 330.

The side-forming parts 200 having a side surface extension member 210 and a wing member 220 are bent from the blocking part 100 and form the side part of the welding wire accommodation-container cover 1000.

The side-fixing parts 300 are alternately provided with the side-forming parts 200 along the side of the blocking part 100, and fix neighboring side-forming parts 200.

The side-fixing parts 300 include a first fixing extension member 310, a connecting member 320, and a second fixing extension member 330.

The first fixing extension member 310 extends from the side of the blocking part 100. Here, the first fixing extension member 310 supports and fixes the outer side surface of the wing member 220 bent from the side surface extension member 210.

The connecting member 320 is configured to connect the first fixing extension member 310 and the second fixing extension member 330. In other words, one end of the connecting member 320 is connected to the first fixing extension member 310, and the other end of the connecting member 320 is connected to the second fixing extension member 330.

At this time, the connecting member 320 extends from the first fixing extension member 310 by a predetermined length. The connecting member 320 is formed to have a separation distance between the first fixing extension member 310 and the second fixing extension member 330 so that the first fixing extension member 310 and the second fixing extension member 330 respectively bent from both ends support and fix the wing member 220.

The second fixing extension member 330 is connected to the other end of the connecting member 320, and supports and fixes the inner side surface of the wing member 220 bent from the side surface extension member 210. In other words, the second fixing extension member 330 is bent from the other end of the connecting member 320 and supports and fixes the inner side surface of the wing member 220.

An insertion member 340 is provided at an end of the second fixing extension member 330, and the side-fixing part 300 may be supported and fixed to the blocking part 100. Specifically, a fitting hole 110 is formed in the center of the side of the blocking part 100 to which the side-fixing part 300 extending from the blocking part 100 is connected. The insertion member 340 is inserted into the fitting hole 110 so that the side-fixing part 300 may be coupled to the blocking part 100 in a state in which the wing member 220 is supported and fixed.

At this time, the insertion member 340 and the fitting hole 110 may be coupled in a forced fitting form.

Referring to the specific shape of the side-fixing part 300 through the surface development of FIG. 1, the first fixing extension member 310 has a shape that becomes narrower in width as it extends from the blocking part 100. In other words, the first fixing extension member 310 forms a trapezoidal shape in which the width becomes narrower toward the outside of the blocking part 100.

In addition, the second fixing extension member 330 has a shape that becomes wider as it extends from the other end of the connecting member 320. In other words, the second fixing extension member 330 forms an inverted trapezoidal shape in which the width gradually increases toward the outside of the blocking part 100.

As described above, as the first fixing extension member 310 becomes narrower moving toward the connecting member 320, the length of the wing member 220 inserted into a separation space between the first fixing extension member 310 and the second fixing extension member 330 may increase.

In addition, as the width of the second fixing extension member 330 increases as it extends from the connecting member 320, the supporting area with the wing member 220 increases so that the side-fixing part 300 firmly supports the side-forming part 200.

As such, the weld wire accommodation-container cover 1000 has a simple assembly configuration and thus is easy to manufacture.

Also, since no separate binding member for binding is required in the welding wire accommodation-container cover 1000, the manufacturing cost of the welding wire accommodation-container cover lid 1000 may be lowered.

In addition, since the welding wire accommodation-container cover 1000 is made of corrugated cardboard, no industrial waste is generated when discarding the welding wire accommodation-container cover 1000.

Figure 4:
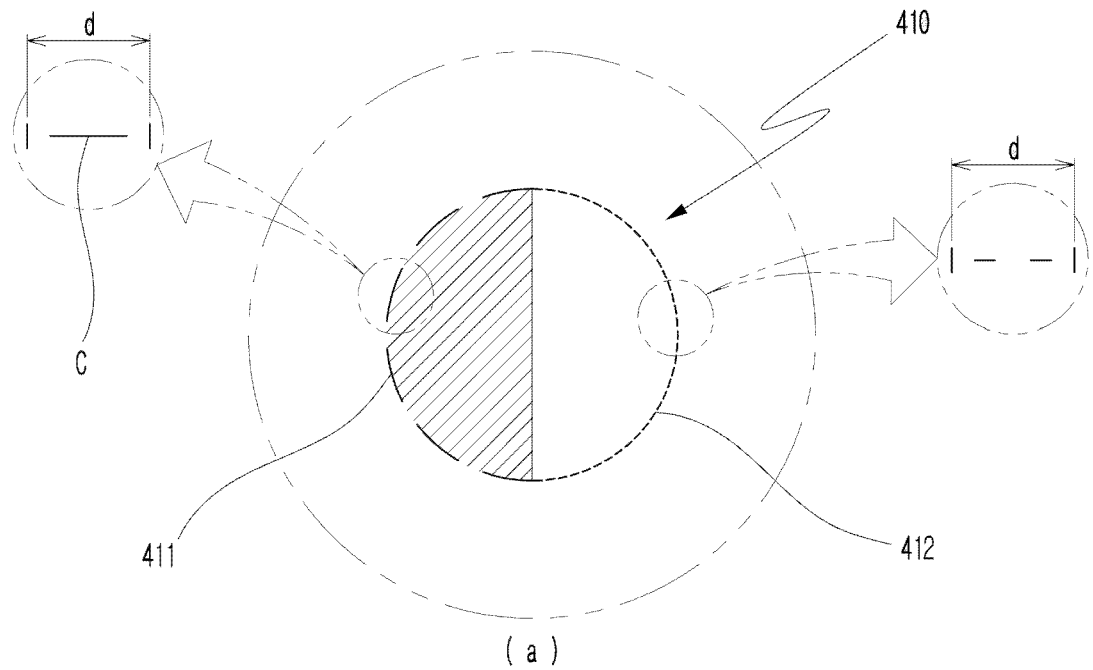
FIG. 4 illustrates the first cut part and the second cut part provided in a welding wire accommodation-container cover according to an embodiment of the present invention, respectively.
Figure 4:
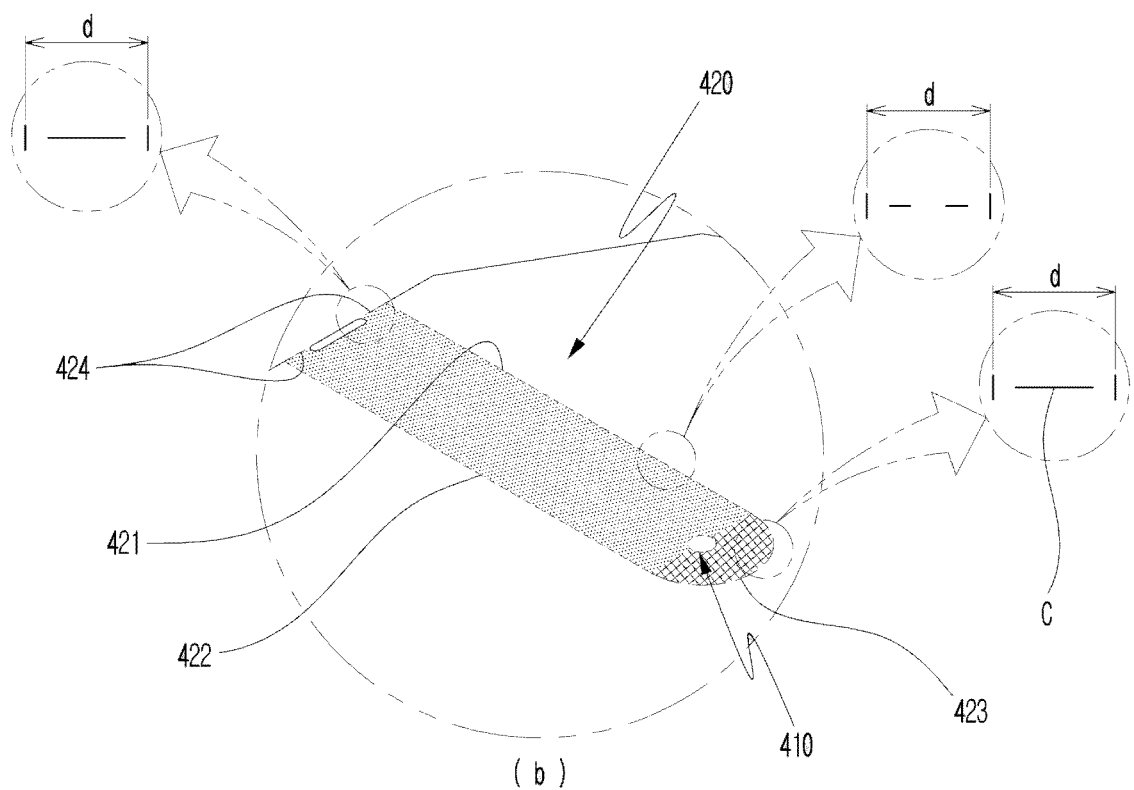

FIG. 4 illustrates the first cut part and the second cut part provided in a welding wire accommodation-container cover according to an embodiment of the present invention, respectively.

Referring to FIG. 4, the welding wire accommodation-container cover 1000 of the present invention is formed in the blocking part 100, and may further comprise a cut part 400 configured to be detachable so that the welding wire wound around the container body part P may be withdrawn to the outside.

The cut part 400 is configured to be partially cut out along a specific shape so that a user can easily tear it off. In other words, the user may use the welding wire accommodation-container cover 1000 itself right away without using a separate head cap member, and may withdraw the welding wire through the part torn along the cut part 400.

The cut part 400 may comprise a first cut part 410 and a second cut part 420 formed to be respectively used according to the user's intended use.

At this time, the first cut part 410 is used when the welding wire accommodation-container is used as an adapter connection type, and the second cut part 420 is used when the welding wire accommodation-container is used as an endless type.

In other words, two types of accommodation-container use may be implemented through the accommodation-container cover 1000 provided with the first cut part 410 and the second cut part 420 according to the present invention.

Referring to (a) of FIG. 4, the first cut part 410 may be formed in the center of the blocking portion 100, preferably formed in a circular shape.

At this time, a coupling hole 120 may be formed in a part torn along the first cut part 410, and a connection adapter 500 which will be described later may be coupled through the coupling hole 120.

In other words, the first cut part 410 is used when the welding wire accommodation-container is used as an adapter connection type.

According to an embodiment, the first cut part 410 may comprise a first arc part 411 and a second arc part 412 each configured to have different ratios of cut part c per unit length d. Preferably, the first arc part 411 and the second arc part 412 may be configured to have a semi-circular arc shape, respectively.

At this time, the ratio R1 of the cut part per unit length of the first arc part 411 may be configured to be greater than the ratio R2 of the cut part per unit length of the second arc part 412.

Accordingly, when the user uses a finger to tear off the first cut part 410, the user may first tear off the first arc part 411 having a larger ratio of cut part per unit length, and then tear off the second arc part 412 having a smaller ratio of cut part per unit length, thereby removing the first cut part 410 more easily.

Referring to (b) of FIG. 4, the second cut part 420 may be elongated from one side of the blocking part 100 to the center portion of the blocking part 100.

More specifically, the second cut part 420 may comprise a first straight line part 421 and a second straight line part 422 formed parallel from one side of the blocking part 100 to a center portion, a curved part 423 formed to connect the first straight line part 421 and the second straight line part 422 in the center portion of the blocking part 100, and a third straight line part 424 formed to connect the first straight line part 421 and the second straight line part 422 while overlapping one side of the blocking part 100.

At this time, a withdrawal space 130 may be formed in the part torn along the second cut part 420, and the welding wire wound around the accommodation-container may be withdrawn through the withdrawal space 130.

Accordingly, as will be described later, when the welding wire accommodation-container is used as an endless type, the withdrawal space 130 of two accommodation-containers placed adjacent to each other may be connected to each other, and the user may implement an accommodation-container of the endless type more easily using the same.

Meanwhile, the second cut part 420 may be configured such that the first cut part 410 formed in the center of the blocking part is located inside the area surrounded by the second cut part 420.

Accordingly, when the welding wire accommodation-container cover 1000 is discarded after being used as an adapter connection type, the disposal efficiency may be improved by quickly removing the welding wire accommodation-container cover 1000 through the second cut part 420 without separating the coupled connection adaptor 500.

According to an embodiment, at least one of the curved part 423 and the third straight line part 424 may be configured to have a ratio of cut part c per unit length d different from that of the first straight line part 421 and the second straight line part 422.

In other words, the ratio R3 of the cut part per unit length of at least one of the curved part 423 and the third straight line part 424 may be configured to be greater than the ratio R4 of the cut part per unit length of the first straight line part 421 and the second straight line part 422.

Accordingly, when the user uses a finger to tear off the second cut part 420, the user may first tear off the curved part 423 or the third straight line part 424 having a larger ratio of cut part per unit length, and then tear off the first straight line part 421 and the second straight line part 422, thereby removing the second cut part 420 more easily.

Figure 5:
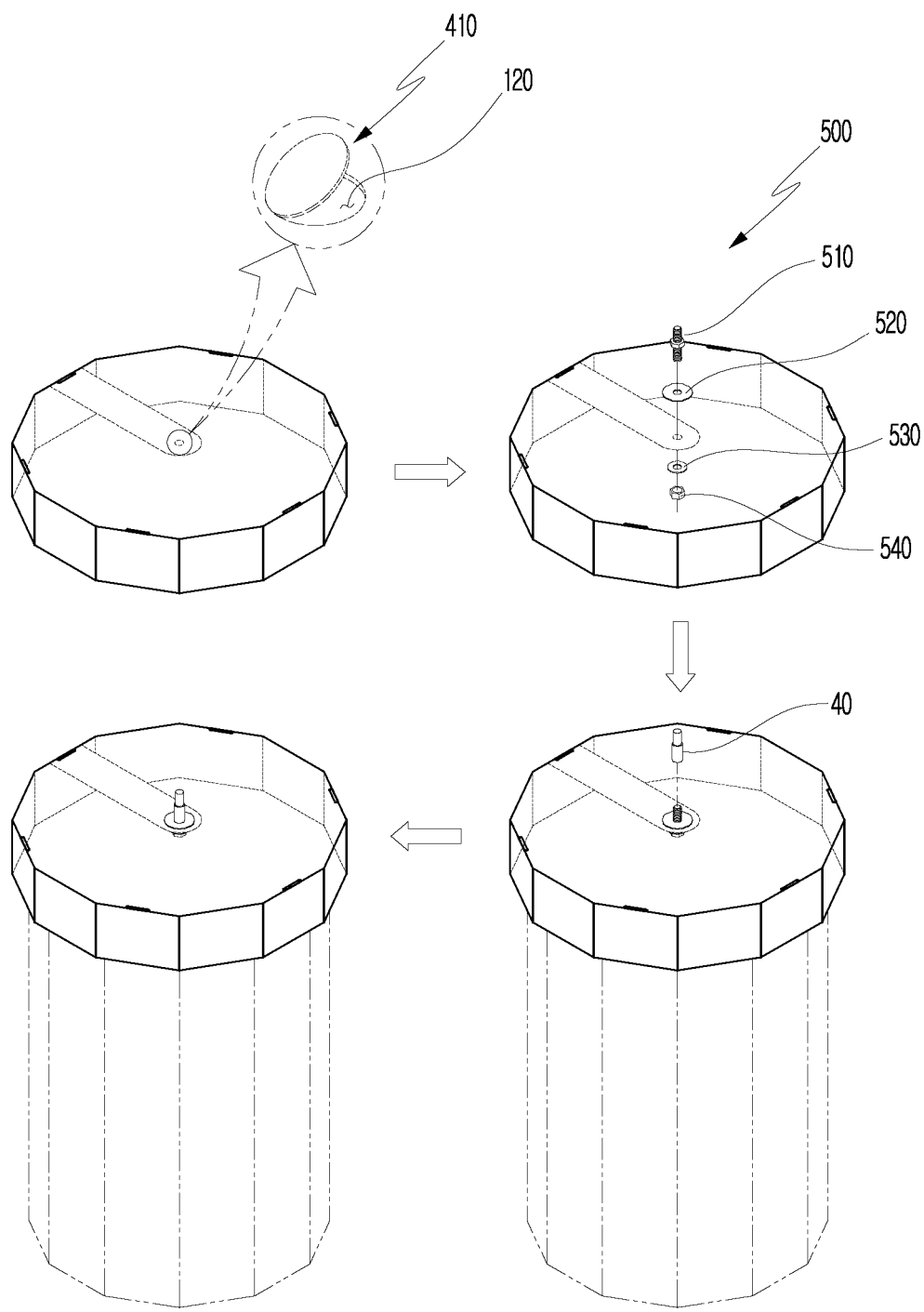
FIG. 5 is a flow chart illustrating a process in which the connection adapter according to an embodiment of the present invention is coupled to the welding wire accommodation-container cover.
Figure 6:
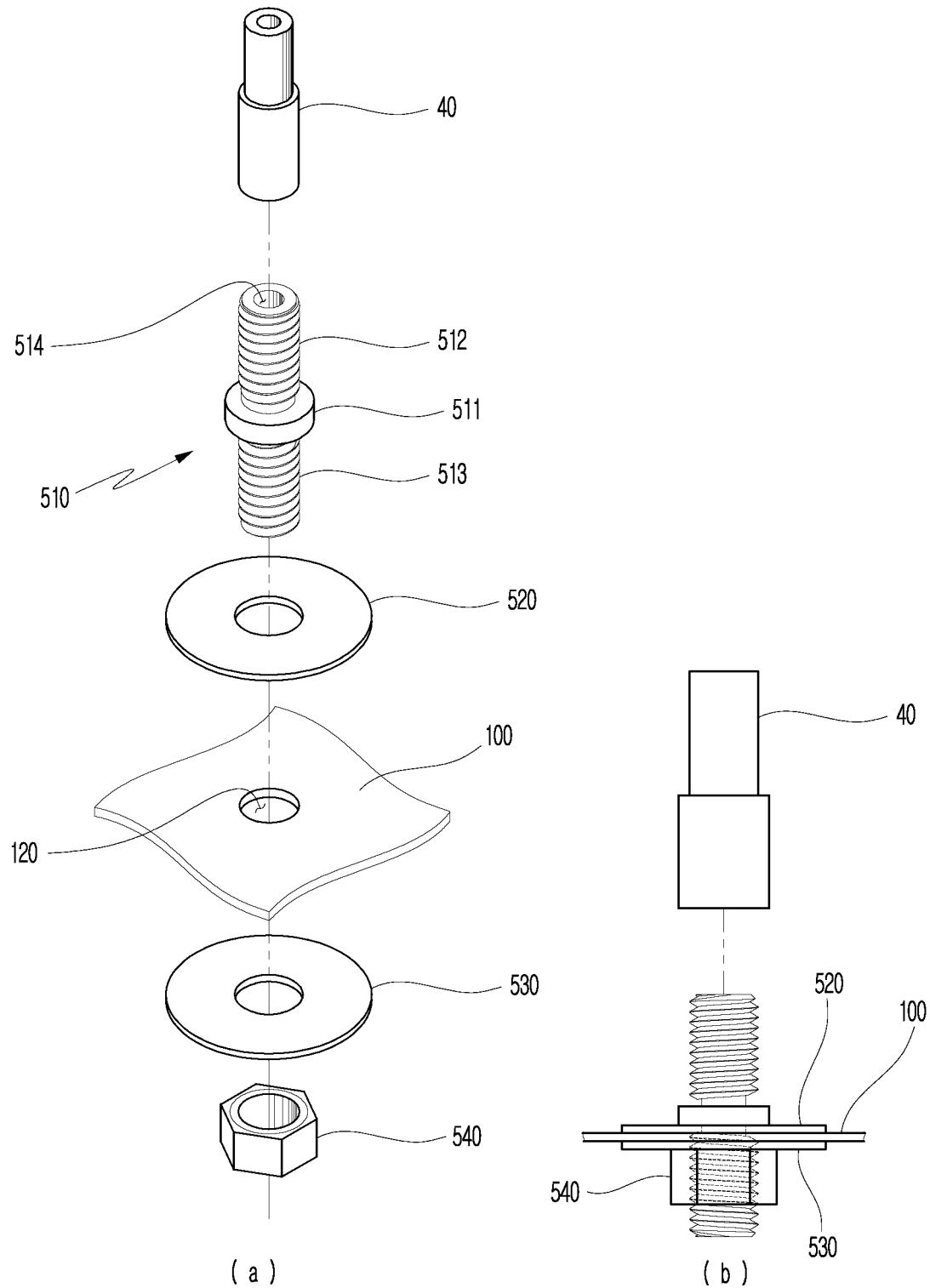
FIG. 6 shows an exploded view (a of FIG. 6) and a coupled view (b of FIG. 6) of a connection adaptor according to an embodiment of the present invention, respectively.

FIG. 5 is a flow chart illustrating a process in which the connection adapter according to an embodiment of the present invention is coupled to the welding wire accommodation-container cover. FIGS. 6(*a*) and (*b*) are an exploded view and a coupled view of a connection adaptor according to an embodiment of the present invention, respectively.

Referring to FIGS. 5 and 6, when the welding wire accommodation-container cover 1000 is used as an adapter connection type, the welding wire accommodation-container cover 1000 may further comprise a connection adapter 500 which is detachably coupled through a coupling hole 120 formed while removing the first cut part 410.

The connection adapter 500 is configured to be easily and quickly coupled through the coupling hole 120, and may be made of a hard material such as metal.

The welding wire wound around the accommodation-container is guided to the outside by the connection adapter 500, and may be used as a welding material by being continuously withdrawn through the cable member 40 coupled to the connection adapter 500.

The connection adapter 500 may comprise a connecting part 510, a first washer 520, a second washer 530, and a nut 540.

The connecting part 510 is a part configuring the body of the connection adapter 500, and may comprise a supporting part 511, a first bolt part 512 formed on an upper side of the supporting part 511, a second bolt part 513 formed on a lower side of the supporting part 511, and a through hole formed penetrating in a central axis direction of the connecting part 510.

At this time, the welding wire wound around the accommodation-container may be withdrawn through the through hole.

The supporting part 511 is a part supported in contact with the upper portion of the blocking part 100 when coupled to the connection adapter 500, and is integrally formed with the first bolt part 512 and the second bolt part 513.

In addition, the supporting part 511 serves to support the first and second bolt parts 512 and 513 between the first and second bolt parts 512 and 513, respectively, and the diameter of the supporting part 511 may be formed to be larger than the diameter of the first and second bolt parts 512 and 513.

The second bolt part 513 is inserted through the coupling hole 120 formed in the blocking part 100, and when the lower portion of the supporting part 511 is supported in contact with the upper portion of the blocking part 100, it is not inserted any further.

At this time, a first washer 520 may be provided between the upper portion of the blocking part 100 and the lower portion of the supporting part 511. The first washer 520 serves to protect the upper surface of the blocking part 100 by dispersing pressure during coupling as a ring-shaped part having an inner hole.

In other words, the first washer 520 is fitted in the second bolt part 513 of the connecting part 510, and the second bolt part 513 is inserted into the coupling hole 120 of the blocking part 100 in a state in which the first washer 520 is fitted therein.

The nut 540 is coupled to the second bolt part 513 at the lower side of the blocking part 100 when the second bolt part 513 is inserted into the coupling hole 120.

At this time, a second washer 530 may be provided between the lower portion of the blocking part 100 and the upper portion of the nut 540. The second washer 530 serves to protect the lower surface of the blocking part 100 by dispersing pressure during coupling as a ring-shaped part having an inner hole.

When the connection adapter 500 is coupled to the welding wire accommodation-container cover 1000, a cable member 40 for withdrawing the welding wire may be connected to the first bolt part 512.

As such, the connection adapter 500 may be firmly and easily coupled to the welding wire accommodation-container cover 1000, and may be easily removed from the cover 1000 when the welding wire accommodated in the accommodation-container is used up.

Figure 7:
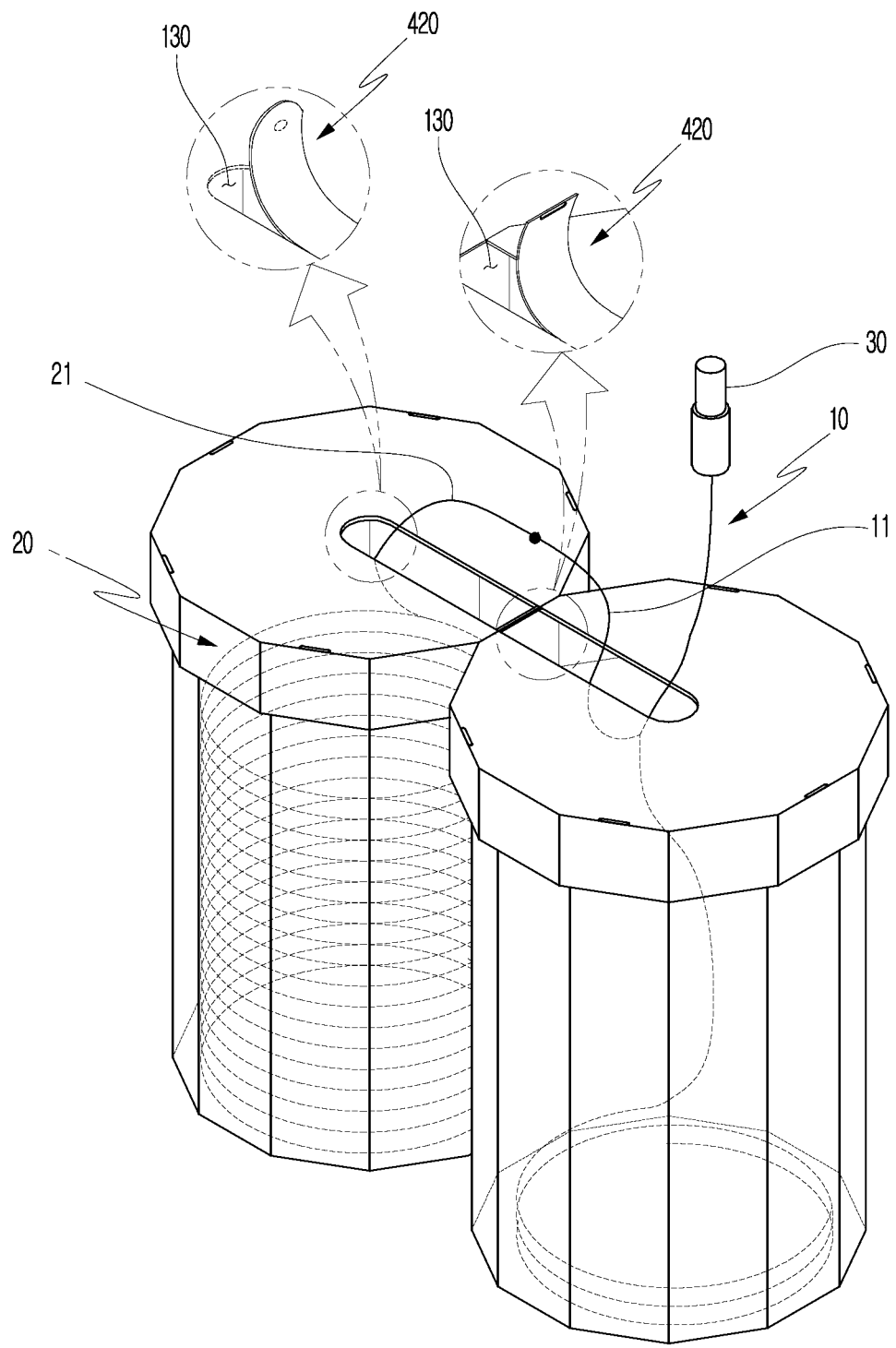
FIG. 7 is a perspective view illustrating how the second cut part of the welding wire accommodation-container cover according to an embodiment of the present invention is used.

FIG. 7 is a perspective view illustrating how the second cut part of the welding wire accommodation-container cover according to an embodiment of the present invention is used.

Referring to FIG. 7, when the welding wire accommodation-container cover 1000 is used as an endless type, first, two accommodation-containers are placed adjacent to each other. At this time, the two accommodation-containers should be placed so that the second cut part 420 provided in each cover 1000 faces each other.

Next, the second cut part 420 provided in each cover 1000 is removed so that a withdrawal space 130 is formed in the cover 1000. At this time, the second cut part 420 may be removed more easily when the curved part 423 or the third straight line 424 formed to have a larger ratio of cut part per unit length is used.

Then, the welding wire 10 wound around one accommodation-container is connected to the withdrawal device 30, and when the would welding wire 10 is almost used up, an end 11 of the welding wire 10 on one side is connected to the first end 21 of the welding wire 20 wound around the other accommodation-container. At this time, since each accommodation-container is placed adjacent to each other so that the second cut part 420 faces each other, welding wire may be connected more easily.

Accordingly, it is possible to use an endless welding wire without connecting the withdrawal device 30 to a new welding wire.

Then, when the welding wire 100 wound around one accommodation-container is used up, a new accommodation-container is placed adjacent as before, and the above process is repeated.

As such, the user may implement an accommodation-container of an endless type more easily by using a welding wire accommodation-container cover 1000 provided with a second cut part 420.

The welding wire accommodation-container cover 1000 may be used right away without a separate head cap member by comprising a cut part 400, and may be implemented as an adaptor connection type or an endless type depending on its use, and thus has improved manufacturing efficiency.

The foregoing description of the present invention has been presented for illustrative purposes, and it is apparent to a person having ordinary skill in the art that the present invention can be easily modified into other detailed forms without changing the technical idea or essential features of the present invention. Therefore, it should be understood that the forgoing embodiments are by way of example only, and are not intended to limit the present disclosure. For example, each component which has been described as a unitary part can be implemented as distributed parts. Likewise, each component which has been described as distributed parts can also be implemented as a combined part.

The scope of the present invention is presented by the accompanying claims, and it should be understood that all changes or modifications derived from the definitions and scopes of the claims and their equivalents fall within the scope of the present invention.

DESCRIPTION OF REFERENCE NUMERALS 1000 wire welding accommodation-container cover
100 blocking part
110 fitting hole
120 coupling hole
130 withdrawal space
200 side-forming part
210 side surface extension member
220 wing member
300 side-fixing part
310 first fixing extension member
320 connecting member
330 second fixing extension member
340 insertion member
400 cut part
410 first cut part
420 second cut part
500 connection adaptor
510 connecting part
520 first washer
530 second washer
540 nut
10 welding wire wound around one accommodation-container
20 welding wire wound around other accommodation-container
30 withdrawing device
40 cable member

What is claimed is:

1. A welding wire accommodation-container cover, comprising:
a blocking part which has a shape corresponding to a transverse cross section of a container body part, and which covers an opening of the container body part;
side-forming parts which are connected to the blocking part, and which are bent from the blocking part so as to be fitted to encompass the outer side surface of the upper portion of the container body part;
side-fixing parts which are alternately provided with the side-forming parts along the side of the blocking part, and which fix neighboring side-forming parts; and
a cut part which is formed at the blocking part, and which is configured to be cut so that a welding wire wound around the container body part is withdrawn to the outside,
wherein the cut part comprises a first cut part which is formed in a circle in the center of the blocking part, and
wherein the cut part comprises a second cut part which has a first straight line part and a second straight line part formed parallel from one side of the blocking part to a center portion, a curved part formed to connect the first straight line part and the second straight line part in the center portion of the blocking part, and a third straight line part formed to connect the first straight line part and the second straight line part while overlapping one side of the blocking part.

2. The welding wire accommodation-container cover of claim 1, wherein the second cut part is configured such that the first cut part formed in the center part of the blocking part is located inside an area surrounded by the second cut part.

3. The welding wire accommodation-container cover of claim 1, wherein the first cut part comprises a first arc part and a second arc part each configured to have different ratios of cut part per unit length, and the ratio R1 of cut part per unit length of the first arc part is configured to be greater than the ratio R2 of cut part per unit length of the second arc part.

4. The welding wire accommodation-container cover of claim 1, wherein the ratio R3 of the cut part per unit length of at least one of the curved part and the third straight line part is configured to be greater than the ratio R4 of cut part per unit length of the second straight line part.

5. The welding wire accommodation-container cover of claim 1, further comprising a connection adaptor which is detachably coupled through a coupling hole formed while removing the first cut part and guides the withdrawal of welding wire wound around the container body part.

6. The welding wire accommodation-container cover of claim 5, wherein the connection adaptor comprises:
- a connecting part which has a supporting part, a first bolt part formed on an upper side of the supporting part, and a second bolt part formed on a lower side of the supporting part, and a through hole formed in a central axis direction;
- a first washer which is fitted into the second bolt part and protects an upper surface of the blocking part when coupled;
- a second washer which is fitted into the second bolt part and protects a lower surface of the blocking part when coupled; and
- a nut which is coupled to the second bolt part and firmly tightens the first washer and the second washer.

* * * * *